United States Patent [19]

Kruse

[11] 4,154,715

[45] May 15, 1979

[54] POLYMERIC POLYBLEND COMPOSITIONS TOUGHENED BY ADDITION OF LIQUID POLYMERS OF A CONJUGATED DIENE MONOMER

[75] Inventor: Robert L. Kruse, Springfield, Mass.

[73] Assignee: Monsanto Company, St. Louis, Mo.

[21] Appl. No.: 667,797

[22] Filed: Mar. 17, 1976

Related U.S. Application Data

[63] Continuation-in-part of Ser. No. 515,933, Oct. 18, 1974, abandoned.

[51] Int. Cl.$^2$ .............................................. C08K 5/01
[52] U.S. Cl. ........................ 260/33.6 AQ; 260/880 R
[58] Field of Search .................. 260/880 R, 33.6 AQ, 260/33.6 UA

[56] References Cited

U.S. PATENT DOCUMENTS

| 2,838,478 | 6/1958 | Hillyer | 260/85.1 |
|---|---|---|---|
| 3,462,516 | 8/1969 | Smith | 260/887 |
| 3,488,743 | 1/1970 | Baer | 260/880 R |
| 3,492,369 | 1/1970 | Naylor | 260/880 R |
| 3,509,237 | 4/1970 | Aubrey | 260/880 R |
| 3,509,238 | 4/1970 | Aubrey | 260/880 R |
| 3,511,895 | 5/1970 | Kydonieus | 260/880 R |
| 3,515,692 | 6/1970 | Carrock | 260/33.6 AQ |
| 3,678,121 | 7/1972 | McElroy | 526/48 |

*Primary Examiner*—Paul R. Michl
*Attorney, Agent, or Firm*—Joseph S. Nelson; William J. Farrington; James C. Logomasini

[57] ABSTRACT

The elongation at fail and toughness of rubber reinforced polystyrene and ABS type polymeric polyblends are improved without loss of tensile strength by the addition of a liquid polymer of a conjugated diene monomer having a molecular weight of from about 1,000 to 10,000. The liquid polymers may be incorporated during any stage of the process for preparing the polymeric polyblend.

12 Claims, No Drawings

POLYMERIC POLYBLEND COMPOSITIONS TOUGHENED BY ADDITION OF LIQUID POLYMERS OF A CONJUGATED DIENE MONOMER

This application is a continuation-in-part of application Ser. No. 515,933, filed Oct. 18, 1974, now abandoned.

BACKGROUND OF THE INVENTION

It is known that polyalkenyl aromatic polymers such as polystyrene and styrene-acrylonitrile polymers (SAN) can have their toughness properties such as impact strength, elongation and overall toughness improved by incorporating commercial diene rubbers having a molecular weight of 30,000 to 250,000 in amounts of 2 to 36 percent by weight. HIPS and ABS are used commercially as tough engineering plastics for molding and sheet products having great commercial utility.

The engineering properties of rubber reinforced HIPS and ABS polymeric polyblends need further improvement to meet the ever increasing industrial requirements of such plastics. In particular, the elongation at fail without loss of tensile strength has been found to be a critical property of toughness that has been only adequate in known HIPS and ABS polyblends.

It is known to add lubricants such as mineral oil and waxes to improve the elongation at fail of such polyblends. However, such additives lower the tensile strength and heat distortion temperature and have not improved overall toughness.

It is an objective of the present invention to provide HIPS and ABS polyblends having improved elongation at fail without loss of tensile strength giving improved overall toughness by the blending of liquid polymers of conjugated diene monomers in the polyblend.

It is also an objective of this invention to provide HIPS and ABS polyblends having improved elongation at fail that can be prepared by polymerization processes wherein the incorporation of a liquid polymer of a conjugated diene monomer in the polymerizing composition does not inhibit the polymerization process and provides a compatible additive for the rubber phase of the polyblend that improves elongation at fail and low temperature properties without loss of tensile strength or heat distortion temperature of the polymeric polyblend.

These and other objectives and advantages of the present invention will become evident from the following summary, detailed description and claims of the invention.

SUMMARY OF THE INVENTION

It has been found that the foregoing and related objectives can be readily attained broadly in a polymeric polyblend composition comprising the polymerization product of:
(A) 13 to 97 parts by weight of at least one monoalkenyl aromatic monomer,
(B) 0 to 85 parts by weight of at least one monoalkenyl nitrile monomer,
(C) 2 to 36 parts by weight of a diene rubber, and about
(D) 0.2 to 20 parts by weight of a liquid polymer of a conjugated diene monomer, the total polyblend being 100 parts by weight.

The invention then is broadly applicable to improved polymeric polyblend compositions of the HIPS and ABS class of polyblends and their preparation wherein said polyblends have improved elongation at fail without loss of tensile strength by the incorporation of 0.2 to 20 parts by weight of a liquid polymer of a conjugated diene monomer in the polyblend, the polyblend being 100 parts by weight.

DETAILED DESCRIPTION OF THE INVENTION

Polyblend Preparation

Those skilled in the art are aware that the term polyblend as employed herein means a mixture of polymers that are substantially imcompatible. HIPS polyblends are mixtures of polystyrene as a matrix phase with a diene rubber phase dispersed therein wherein the rubber phase has been grafted with polystyrene to aid in its dispersion as particles in the polystyrene phase. ABS polyblends are mixtures of diene rubbers dispersed in a SAN polymer matrix phase with the rubber phase grafted with SAN to aid in its dispersion as particles. The polyblends may be prepared by:
(1) mechanical melt mixing of the two phases;
(2) mass polymerizing a solution of the diene rubbers dissolved in the monomers under agitation either batchwise or continuously;
(3) a combination of mass and suspension polymerization wherein a monomer/rubber solution is mass polymerized to 10 to 50 percent conversion under agitation followed by suspending the polymerization mixture in an inert liquid (e.g. water) and completing the polymerization, and
(4) emulsion polymerizing the monomers wherein the monomers are added to a rubber latex emulsion, emulsified with the rubber and polymerized as a monomer/rubber mixture.

These methods are known to those skilled in the art. U.S. Pat. No. 3,488,743 teaches the mass/suspension polymerization of HIPS polyblends and the melt mixing of HIPS polyblends in Example 1. U.S. Pat. No. 3,509,237 teaches the emulsion polymerization, the mass/suspension polymerization and melt blending of ABS polyblends in Example 1, parts A, B and C respectively. The continuous mass polymerization of HIPS and ABS polyblends has been taught in U.S. Pat. No. 3,511,895.

The polyblend compositions of the present invention are HIPS and ABS polyblends which have improved elongation at fail yet high tensile strength, by the addition of about 0.2 to 20 parts by weight of a liquid polymer of a conjugated diene monomer during the melt blending or polymerization of the polyblend.

The polyblend composition of the present invention can be prepared as the polymerization product of methods (2), (3) and (4) wherein the product is improved by the addition of about 0.2 to 20 parts of a liquid polymer of a conjugated diene monomer to the polymerizing mixture of monomers and rubber. The liquid polymer may be added as part of the feed composition or at any stage of the polymerization. The liquid polymer has not been found to effect the polymerization adversely, e.g. the rates of polymerization, hence, can be added at any stage of conversion. Preferably, it is most economically added as part of the feed composition in the mass and mass/suspension processes. In the emulsion processes it is preferably added most economically to the rubber latex as a solution in said monomers before polymerization. However, if the rubber latex is to be agglomerated to form larger particles it is preferred to add the liquid polymer with the monomers. It is known to coagulate the rubber latex, separate the rubber and disperse it to the monomers followed by mass polymerization. It is preferred in such processes to add the liquid polymers with the rubber to the monomers before or during mass polymerization. It is known to solution polymerize said polyblend compositions or to mass polymerize with 5 to 20 percent of a diluent to control the heats of polymerization. In such processes it is preferred to add the liquid polymers to the initial polymerizing composition, although they can be added at any stage of polymerization if desired.

The melt blending of polymers to form polyblends is known to those skilled in the art. Such melt blending can be carried out in commercial extruders, banburys or any high shearing mixer or colloiding device wherein the mixing and colloiding of the matrix polymers, rubbers and liquid polymers are uniformly mixed and blended at the melt temperature of the matrix phase. HIPS polyblends can be melt blended at temperatures of 150° C. to 260° C., preferably 200° C. to 240° C., whereas ABS are melt blended at temperatures of 215° C. to 260° C., preferably 235° C. to 250° C.

Polyalkenyl Aromatic Polymers and Monomers

The alkenyl aromatic polymer of the polyblend comprises at least one monoalkenyl aromatic monomer of the formula

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in polymerization are styrene; alpha-alkyl monovinylidene monoaromatic compounds, e.g. alpha-methylstyrene, alph-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed. The average molecular weight of the monoalkenyl aromatic polymers can range from 20,000 to 100,000 Staudinger, preferably 40,000 to 60,000.

In the HIPS polyblends the monoalkenyl aromatic monomer can be present in amounts from about 13 to 98 parts, preferably from about 60 to 97 parts and most preferably from about 80 to 97 parts by weight the polyblend being 100 parts by weight.

Diene Rubbers

The diene rubbers of the polyblend are any rubber polymer (a rubbery polymer having a second order transition temperature not higher than 0° centigrade, preferably not higher than −20° centigrade, as determined by ASTM Test D-746-52T) of one or more of the conjugated, 1,3-dienes, e.g. butadiene, isoprene, 2-chloro-1,3 butadiene, 1 chloro-1,3 butadiene, piperylene, etc., and also cyclopentadiene. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl -4- chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and vinylidene chlorides and bromides, etc.); and the like.

Although the rubber may contain up to about 2.0 percent of a crosslinking agent, based on the weight of the rubber-forming monomer or monomers, crosslinking may present problems in dissolving the rubber in the monomers for the graft polymerization reaction. In addition, excessive crosslinking can result in loss of the rubbery characteristics.

A preferred group of rubbers are the stereospecific polybutadiene rubbers formed by the polymerization of 1,3 butadiene. These rubbers have a cis-isomer content of about 30–98 percent and a trans-isomer content of about 70-2 percent and generally contain at least about 85 percent of polybutadiene formed by 1,4 addition with no more than about 15 percent by 1,2 addition. Mooney viscosities of the rubber (ML-4, 212° F.) can range from about 20 to 70 with a second order transition temperature of from about −50° C. to −105° C. as determined by ASTM Test D-746-52T.

In the HIPS polyblends the diene rubber can be present in amounts of from about 2 to 36 parts by weight, preferably from about 2 to 20 parts by weight, the polyblend being 100 parts by weight.

In the ABS polyblends the diene rubber can be present in amounts of from about 2 to 60 parts by weight, preferably from about 2 to 36 parts by weight, the polyblend being 100 parts by weight.

Alkenyl Nitrile Monomers and Polymers

Exemplary of the monoalkenyl nitrile monomers are those having the formula:

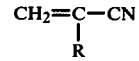

wherein R is selected from the group consisting of hydrogen and alkenyl radicals containing 1 through 4 carbon atoms. The monoalkenyl nitrile monomers can be selected from the group consisting of acrylonitrile, methacrylonitrile, ethacrylonitrile and mixtures thereof.

In the ABS polyblends, the polymerizable monomers contain at least 13 parts by weight of monoalkenyl aromatic monomer and preferably from about 13 to 97 parts, most preferably from about 50 to 75 parts by weight. The monoalkenyl monomers can be present in amounts of from about 5 to 85 parts, most preferably from 20 to 50 parts by weight, the polyblend being 100 parts by weight.

Exemplary of the monomers which may be interpolymerized with the monoalkenyl aromatic and monoalkenyl nitrile monomers are conjugated 1,3 dienes, e.g. butadiene, isoprene, etc.; alpha- or beta-unsaturated mono-basic acids and derivatives thereof, e.g. acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate; etc.; dialkyl maleates or fumarates such as dimethyl maleate, diethyl maleate, dibutyl maleate, the corresponding fumarates, etc. Small amounts of the above monomers can be used in HIPS and ABS polyblends, for improved properties, preferably 1 to 25 parts, most preferably 5 to 15 parts by weight, the polyblend being 100 parts by weight. Such monomers can be used with the matrix monomers or the diene rubber monomers as copolymer monomers.

Liquid Polymers of a Conjugated Diene Monomers

The liquid polymers of a conjugated diene monomer can be prepared in mass, suspension, emulsion or solution. The liquid polymer can be a homopolymer of a conjugated diene (diolefin) monomer of 4 to 6 carbon atoms, e.g. 1,3 butadiene, 1 or 2 chlorobutadiene (chloroprene), isoprene, piperlene, cyclopentadiene, 2,3 dimethyl butadiene or copolymers of said monomers. Such liquid polymers of a conjugated diene monomer also include copolymers of diene monomers with monoalkenyl aromatic and/or monoalkenyl nitrile monomers such as styrene, alpha methyl styrene, acrylonitrile, methacrylonitrile and the like. The liquid polymer of a copolymer of a conjugated diene monomer can have up to about 50 percent by weight of the above comonomers preferably up to about 20 percent. One procedure for preparing liquid polymers of conjugated diene monomers is taught in U.S. Pat. No. 3,462,516 using alkali metal catalysis in particular sodium. The liquid polymers have molecular weights in the range of 300 to 20,000, preferably 500 to 10,000. These polymers are normally liquid and have no measurable large rotor Mooney value at 212° C., hence, are not considered to be rubbers. The liquid polymers can be terminated with xanthate, mercaptan, hydroxyl or carboxyl groups. Other terminating groups can be used, such as SOH, $SO_2H$, $SO_3H$, $SeO_24$, $SeO_3H$, $LiO_2H$, $SnO_2H$, $SbO_2H$, SbOH, $SbO_3H$, $TeO_2H$ and the like.

Another procedure commonly used involved solution polymerization in the presence of the alkali metal catalyst lithium as taught in U.S. Pat. No. 3,462,516. The general reaction can be illustrated graphically as follows:

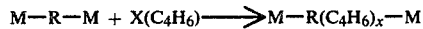

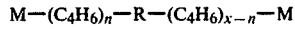

or combinations thereof in which M R M is an organoalkali metal compound. A specific example is:

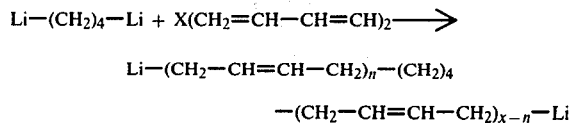

In the specific example, 1,4-addition of butadiene is shown; however, it should be understood that 1,2-addition and combinations of 1,4 and 1,2-addition can also occur.

Treatment of this resulting polymer with carbon dioxide and a mineral acid results in the lithium atoms being replaced by a carboxy group with the lithium separating as the salt of the acid. Thereby such treatment results in a carboxy-terminated polymer. A hydroxy-terminated polymer containing reactive hydroxy end groups can be obtained by reacting the polymer having the terminal lithium atoms with an epoxy compound at elevated temperatures, followed by treatment with a mineral acid to replace the lithium atoms with hydrogen atoms.

Liquid rubbers are formed in the range of between −100° and +150° C., preferably between −75° and +75° C. The particular temperatures employed will depend upon both the monomers and the initiators used in preparing the polymers and one skilled in the art would have no difficulty in choosing the particular initiator and the particular pressures and temperatures necessary to achieve a particular result. This is well within the knowledge of the art. The amount of catalyst employed can vary but is preferably in the range of between about 1 and about 30 millimoles per 100 grams of monomer. It is preferred that the polymerization be carried out in the presence of a suitable diluent such as benzene, toluene, cyclohexane, xylene, n-butane or the like. Generally, the diluent is selected from hydrocarbons such as paraffins, cycloparaffins, and aromatics containing from 4 to 10 carbon atoms per molecule.

The above liquid polybutadienes have functional terminal groups only. A preferred class of liquid diene polymers are those that are terminated with other than functional groups classified as telomers. U.S. Pat. No. 3,760,025 discloses such telomers having telogens or terminal groups terminating the polymer of diene monomers or taxogens.

The telogens which are used are aromatic compounds, especially aromatic hydrocarbon compounds containing at least one hydrogen capable of being replaced by a lithium atom but devoid of any other substituents as, for instance, hydroxyl, chlorine, bromine, iodine, carboxyl, and nitro, which substituents are reactive with the organolithium compositions or complexes which are utilized as catalysts. Illustrative examples of such telogens are benzene, $C_1$-$C_4$ mono-, di-and trialkyl benzenes exemplified by toluene, ethylbenzene, n-propylbenzene, isopropylbenzene, o-, m- and p-xylenes; 1,3,5-trimethyl-benzene; n-, sec- and tertbutylbenzenes; cyclohexylbenzene; alkyl, notably $C_1$-$C_4$, and cycloalkyl substituted polycyclic aromatic compounds exemplified by 1,2,3,4-tetrahydronaphthalene, 1-methylnaphthalene, 1-isopropylnaphthalene, 1,3-isobutylnaphthalene, and 1-cyclohexylnaphthalene; alkoxy-aromatic compounds exemplified by anisole; 1,3-dimethoxybenzene; mono-propoxybenzene; 1-methoxynaphthalene and 1,3-dimethoxynaphthalene; dialkylamino-aromatic compounds, notably those in which the alkyl is $C_1$-$C_4$, exemplified by dimethylaminobenzene; 1,3-bis-(diisopropylaminobenzene) and 1-dimethylaminonaphthalene. Especially satisfactory is toluene. Said telogens usually provide one terminal phenyl group per diene polymer chain with the other end group being the organo group of the organo metallic initiator, e.g., a lower alkyl.

U.S. Pat. Nos. 3,678,121 and 3,751,501 describe other liquid diene polymers having various microstructures for the diene moiety. Such liquid diene polymers can range from 75 to 95 percent unsaturation having a polybutadiene microstructure of about 5 to 40 percent trans 1,4, about 5 to 35 cis, 1,4 and about 35 to 90 percent 1,2 vinyl ranging preferably from about 500 to 3000 in molecular weight and having 3 to 10 percent by weight of terminal aralkyl groups. The polybutadiene microstructure may also contain from about 5 to 25 percent of cyclized 1,2 structure. The terminal lithium group can be removed with aralkyl or with acids such as hydrochloric to introduce a hydrogen to terminate the chain.

Such liquid polymers of a conjugated diene monomer, having unreactivity terminated polymers, are commercially available from the (1) Lithium Corporation of America, 2 Pennsylvania Plaza, New York, N.Y., under the Trademark "Lithene"; (2) The Richardson Company of Melrose Park, Illinois under the Trademark "Ricon" or (3) The Dynachem Corporation, Sante Fe Springs, California under the Trademark "Hystel".

The invention then is broadly applicable to improved polymeric polyblend compositions of the HIPS and ABS class of polyblends and their preparation wherein said polyblends have improved elongation at fail without loss of tensile strength by the incorporation of 0.2 to 20 parts by weight of a liquid polymer of a conjugated diene monomer in the polyblend, the polyblend being 100 parts by weight. On a weight percent basis, about 5 to 50, preferably 10 to 30 weight percent of the diene rubber in the polymeric polyblend can be replaced with the liquid polymer of a diene monomer described above to provide a polymeric polyblend with improved elongation at fail and overall toughness.

The following examples illustrate ways in which the principle of the invention has been applied, but are not to be construed as limiting in scope.

EXAMPLE 1

HIPS POLYBLEND PREPARATION

In a reaction vessel were stirred together 8.0 parts of a butadiene homopolymer having a molecular weight of about 94,000 and 92.0 parts of styrene monomer. The admixture also contained 0.1 part di-tert-butyl peroxide, 0.05 part tert-dodecyl mercaptan, and minor amounts of antioxidant and mineral oil.

Polymerization en masse was conducted to approximately 30.0 percent conversion and the syrup thus produced was thereafter admixed with 425.0 parts of water and a suspending agent formulation provided by 0.5 part of an interpolymer of 95.5 mol percent acrylic acid and 4.5 mol percent 2-ethylhexyl acrylate, 0.3 part calcium chloride and 1.0 part of the condensation product of naphthalene sulfonic acid and aldehyde sold by R. T. Vanderbilt under the Trademark DARVAN. The suspension was stirred and initially heated to about 100° centigrade; thereafter, it was heated with stirring to about 155° centigrade for a polymerization cycle rate of about four hours and at a pressure of about 75 to 90 pounds per square inch. Thereafter, the batch was cooled, centrifuged, washed and dried to recover the polymerized product in the form of small spherical beads. The beads recovered from the polymerization process contained about 8.0 percent by weight rubber which had been grafted to a superstrate:substrate ratio of 170:100, and the rubber particles had a diameter of 0.4 to 2.0 microns with an average size of about 0.8 micron.

Thereafter, 62.5 parts of the beads thus produced were melt blended with 37.5 parts of polystyrene homopolymer, 0.3 parts of an alkylated phenol antioxidant and 0.2 parts of a stearate soap to provide a HIPS polyblend composition having 5 percent by weight of rubber. An extruded specimen produced therefrom was found to have a tensile at yield of 2,900 psi, and at fail 3,600 psi with a elongation at fail of 22 percent as determined by ASTM D-638 tests.

EXAMPLE 2

ABS POLYBLEND PREPARATION

Part A

To a 250.0 parts of a latex of butadiene/acrylonitrile copolymer (93:7) containing 50.0 percent solids and approximately 1.0 part of rubber reserve soap as an emulsifier were added 70.0 parts water, 1.0 part rubber reserve soap and 1.0 part potassium persulfate.

This emulsion was heated to 65° centigrade with stirring and then there were added thereto over a period of about six hours 140.0 parts styrene, 60.0 parts acrylonitrile and 3.0 parts of terpinolene. The emulsion was held at temperature for one hour thereafter with stirring, cooled, coagulated by the addition of magnesium sulfate and the coagulant was then washed and dried. The resulting graft copolymer has a superstrate to substrate ratio of about 0.9:1.0 and a particle size (number average) of about 0.14 micron.

Part B

Fourteen parts of a soluble butadiene rubber were dissolved in 26.0 parts of acrylonitrile and 60.0 parts styrene. There were added thereto 0.07 part of a mixture of tertbutyl peracetate, 0.05 part di-tert-butyl peroxide and stabilizers. The mixture was heated to 100° centigrade with stirring. Terpinolene was added as a chain transfer agent over a period of approximately five hours, at the end of which time an additional 0.4 part was added.

At 30.0 percent conversion of the monomers, the partially polymerized syrup was dispersed in 120.0 parts water to which was added 2.0 parts styrene and, as a suspending agent, 0.3 part of an interpolymer of 95.5 mol percent of acrylic acid and 4.5 mol percent of 2-ethylhexyl acrylate which has a specific viscosity of about 4.0 as determined in a 1.0 percent solution in water at 25° centigrade. The resulting suspension was stirred and heated to polymerize the remaining monomer, cooled, centrifuged, washed and dried to recover the graft copolymer in the form of small spherical beads. The ratio of superstrate to substrate was about 0.9 to 1.0:1.0, and the particle size was about 0.9 micron.

Part C

The graft copolymer of Part A (21.4 parts) was melt blended with 78.6 parts of a SAN copolymer to form a polyblend having about 7.47 parts of diene rubber and tested. The tensile strength at yield was 6,600 psi. ($4.6 \times 10^6$ kgs/sq.m.), at fail 6,000 psi. ($4.2 \times 10^6$ kgs/sq.m.) and the elongation at fail was 25 percent. (ASTM D-638).

Part D

The graft copolymer of Part (B) (51.0 parts) was blended with 47.5 parts of SAN copolymer and 1.5 parts carbowax providing 7.21 parts by weight of diene rubber in the polyblend. The tensile strength at yield was 6,000 psi. (4.2×10$^6$ kgs/sq.m.) and at failure, 5,600 psi. (3.9×10$^6$ kgs/sq.m.) giving an elongation at fail of about 20 percent (ASTM D-638).

EXAMPLE 3

HIPS Polyblend with Liquid Polymers

Example 1 was repeated using 95 parts of styrene monomer, 4 parts of a homopolymer of butadiene (Mooney viscosity of 35) and 1 part of a liquid polymer of a butadiene monomer (Lithene QH, 35 percent vinyl, molecular weight 3,000). The polymerization product contains 4 parts of a diene rubber and 1 part of liquid polymer comparable to the final blended product of Example 1 having 5 parts or 5 percent by weight of a diene rubber. The tensile strength at yield was 3,000 psi. (2.1×10$^6$ kgs/sq.m.), a tensile strength at fail of 3,500 psi. (2.5×10$^6$ kgs/sq.m.), and an elongation at fail of 46 percent (ASTM D-638). It is evident that the polyblend having 1 part by weight (20 percent by weight) of a diene rubber replaced with a liquid polymer of a butadiene monomer unexpectedly had about 100 percent increase in elongation at fail without a loss of tensile strength at yield providing superior overall toughness.

EXAMPLE 4

ABS Polyblends with Liquid Polymers

Example 2, Parts A and C were repeated using 25.0 parts or 20 percent by weight of a liquid polymer of a butadiene monomer Lithene QH as 25.0 parts of the butadiene/acrylonitrile diene rubber in Part A. The tensile strength (T.S.) of the polyblend at yield was found to be 6,000 psi (4.2×10$^6$ kgs/sq.m.) and the T.S. at fail to be 6,500 psi. (4.6×10$^6$ kgs/sq.m.) with the elongation at fail being about 51 percent (ASTM D-638).

Example 2, Parts B and D were repeated replacing 2.8 parts by weight of the diene rubber with 2.8 parts (20 percent by weight) of the liquid polymer in Part B. The tensile strength at yield of the polyblend was 6,500 psi. (4.6×10$^6$ kgs/sq.m.)., at fail 7,000 psi (4.9×10$^6$ kgs/sq.m.) and the elongation at fail of about 45 percent (ASTM D-638). It was found unexpectedly that the ABS polyblends had about an 100 percent increase in elongation at failure without loss of tensile strength giving overall improved toughness.

EXAMPLE 5

HIPS Polyblends Melt Blended with Liquid Polymer

Example 1 was repeated providing a HIPS polyblend with about 8.0 percent by weight of diene rubber. Thereafter, 50.0 parts by weight of beads thus produced were melt blended with 1.0 parts of a liquid polymer of a butadiene monomer (Lithene QH) and 49.0 parts of a polystyrene homopolymer providing a polyblend with 4 parts by weight of diene rubber, 1 part by weight (20 weight percent) of a liquid polymer and 95 parts by weight of homopolymer. An extruded specimen produced therefrom was found to have a tensile strength at yield of 3,000 psi (2.1×10$^6$ kgs/sq.m.), at fail of 3,700 psi (2.6×10$^6$ kgs/sq.m.) and an elongation at fail of about 42 percent (ASTM D-638). It has been found that the HIPS polyblend products of melt blending at HIPS polyblend with a liquid polymer of a butadiene monomer unexpectedly provided greatly improved elongation at fail without loss of tensile strength giving a polyblend of improved overall toughness.

EXAMPLE 6

ABS Polyblends Melt Blended with Liquid Polymer

Example 5 was repeated using the ABS polyblend produced in Example 2D having 7.21 parts by weight (weight percent) of diene rubber in the ABS polyblend. About 66.0 parts of the polyblend were melt blended with 1.44 parts of liquid polymer (Lithene QH) and 27.8 parts of SAN polymer providing a polyblend having 4.77 parts by weight of diene rubber, 1.44 parts by weight (20 weight percent) liquid polymer. An extruded specimen produced therefrom had a tensile strength at yield of 6,300 psi (4.4×10$^6$ kgs/sq.m.), 6,600 psi (4.6×10$^6$ kgs/sq.m.), at fail and an elongation at fail of about 43 percent.

EXAMPLES 7-18

HIPS and ABS polyblends were melt blended with varying amount of liquid polymer as in Examples 5 and 6. The proportions of the formulations are shown below along with test properties.

EXAMPLES 7 - 18

| Example | Polymeric Polyblend | Parts Diene Rubber | Parts Liquid Polymer[1] | Tensile Strength Yield (psi) (kg/sq.m × 10$^6$) | Tensile Strength Fail (psi) (kg/sq.m × 10$^6$) | Elongation at Fail % |
|---|---|---|---|---|---|---|
| 7 | HIPS | 5.0 | 0.0 | 2900 (2.04)* | 3600 (2.54)** | 22 |
| 8 | HIPS | 4.5 | 0.5 | 3200 (2.25) | 3900 (2.74) | 36 |
| 9 | HIPS | 4.0 | 1.0 | 3000 (2.10) | 3500 (2.46) | 42 |
| 10 | HIPS | 2.5 | 2.5 | 2800 (1.97) | 3200 (2.25) | 84 |
| 11 | ABS | 7.2 | 0.0 | 6600 (4.64) | 6000 (4.20) | 25 |
| 12 | ABS | 4.8 | 1.4 | 6300 (4.42) | 6600 4.64) | 43 |
| 13 | ABS | 3.6 | 3.6 | 6100 (4.30) | 6300 (4.42) | 79 |
| 14 | ABS | 18.0 | 0.0 | 5100 (3.60) | 4500 (3.16) | 40 |
| 15 | ABS | 14.4 | 3.6 | 5300 (3.73) | 4800 (3.38) | 75 |
| 16 | HIPS | 4.0 | 1.0[2] | 3000 (2.10) | 3700 (2.60) | 42 |
| 17 | HIPS | 4.0 | 1.0[3] | 2800 (1.97) | 3700 (2.80) | 38 |

EXAMPLES 7 – 18-continued

| Example | Polymeric Polyblend | Parts Diene Rubber | Parts Liquid Polymer[1] | Tensile Strength Yield (psi) (kg/sq.m × 10⁶) | Tensile Strength Fail (psi) (kg/sq.m × 10⁶) | Elongation at Fail % |
|---|---|---|---|---|---|---|
| 18 | HIPS | 4.0 | 1.0[4] | 3100 (2.18) | 4000 (2.80) | 37 |

[1]Lithene QH (35% vinyl, mol. weight 3000)
[2]Hystel B-2000 (90% vinyl, mol. weight 2000)
[3]Ricon 150 (70% vinyl, mol. weight 2000)
[4]Lithene AH (55% vinyl mol. weight 1800)
*(kg/sq.m × 10⁶)
**(kg/sq.m × 10⁶)

It is evident from the test data that the HIPS polyblend control (Example 7) having a 22 percent elongation at fail and the ABS polyblend control (Example 11) having 25 percent, have the elongation at fail greatly improved by incorporating a liquid polymer of a conjugated diene monomer therein wherein about 10 to 50 percent by weight of the diene rubber is replaced with the liquid polymer.

What is claimed is:

1. A method for preparing an improved polymer polyblend composition which comprises blending a liquid polymer of a conjugated diene monomer with the polymerization product of
   (A) 13 to 97 parts by weight of at least one monoalkenyl aromatic monomer,
   (B) 0 to 85 parts by weight of at least one monoalkenyl nitrile monomer, and
   (C) 2 to 36 parts by weight of a diene rubber, wherein said liquid polymer is blended with said polyblend in an amount of about 0.2 to 20 parts by weight, said polymer containing groups selected from the group consisting of hydroxyl, carboxy, mercaptan, xanthate, hydrogen, aralkyl and phenyl or mixtures thereof, said groups being present at the terminal position only of said liquid polymer, the total polyblend being 100 parts by weight.

2. A method of claim 1, wherein said monoalkenyl aromatic monomer is styrene, aralkylstyrene, alphalkystyrene, alpha-arhalostyrene and mixtures of the same.

3. A method of claim 1, wherein said monoalkenyl aromatic monomer is styrene.

4. A method of claim 1, wherein said monoalkenyl nitrile monomer is acrylonitrile or methacrylonitrile and mixtures of the same.

5. A method of claim 1, wherein the monoalkenyl nitrile monomer is acrylonitrile.

6. A method of claim 1, wherein said diene rubber is polybutadiene, butadiene-styrene copolymer, butadiene-acrylonitrile copolymer of polypentenamer or mixtures thereof, wherein said polybutadiene rubber has a cis isomer content of about 30 percent to 98 percent and a Tg range of from about −50° C. to −105° C., said butadiene copolymer rubbers having a Tg range of from about −20° C. to −70° C.

7. A method of claim 1, wherein said diene rubber is polybutadiene.

8. A method of claim 1, wherein said liquid polymer of a conjugated diene monomer is a polybutadiene, a butadiene-styrene copolymer or a butadiene-acrylonitrile copolymer and mixtures of the same.

9. A method of claim 1, wherein said liquid polymer is a polybutadiene having a molecular weight of from about 1,000 to 10,000.

10. A method of claim 1, wherein said liquid polymer is a polybutadiene containing terminal aralkyl groups.

11. A method of claim 1, wherein said liquid polymer is a polybutadiene containing terminal hydrogen.

12. A method of claim 1, which comprises blending a liquid polymer of a conjugated diene monomer with the polymerization product of
   (A) 13 to 97 parts by weight of styrene,
   (B) 0 to 98 parts by weight of acrylonitrile,
   (C) 2 to 36 parts by weight of polybutadiene rubber, wherein said liquid polymer of a conjugated monomer has a molecular weight of about 500 to 10,000 and is blended with said polyblend in an amount of about 0.2 to 20 parts by weight, the total polyblend being 100 parts by weight.

* * * * *